(12) United States Patent
Yamada et al.

(10) Patent No.: US 6,931,200 B1
(45) Date of Patent: Aug. 16, 2005

(54) OPTICAL DISC PLAYBACK APPARATUS AND OPTICAL DISC PLAYBACK METHOD

(75) Inventors: Jiro Yamada, Kyoto (JP); Masato Negishi, Neyagawa (JP)

(73) Assignee: Matsushita Electric Industrial Co., Ltd. (JP)

( * ) Notice: Subject to any disclaimer, the term of this patent is extended or adjusted under 35 U.S.C. 154(b) by 994 days.

(21) Appl. No.: 09/590,138

(22) Filed: Jun. 9, 2000

(30) Foreign Application Priority Data

Jun. 10, 1999 (JP) .......................................... 11-163273

(51) Int. Cl.[7] .............................................. H04N 5/91
(52) U.S. Cl. .......................... 386/95; 386/125; 386/126
(58) Field of Search ............................. 386/46, 95, 125, 386/126, 96; 369/47.15; H04N 5/91

(56) References Cited

U.S. PATENT DOCUMENTS

| | | | | |
|---|---|---|---|---|
| 6,449,227 B1 | * | 9/2002 | Heo | ........................ 369/47.15 |
| 2004/0170393 A1 | * | 9/2004 | Heo | ............................. 386/96 |

FOREIGN PATENT DOCUMENTS

| | | |
|---|---|---|
| EP | 0 737 009 | 10/1996 |
| EP | 0 737 980 | 10/1996 |
| EP | 0 776 008 | 5/1997 |
| EP | 0 856 849 | 8/1998 |
| EP | 0 896 335 A2 | 2/1999 |
| EP | 0 918 332 A2 | 5/1999 |
| EP | 0 944 087 A2 | 9/1999 |
| JP | 9-147487 | 6/1997 |
| JP | 11-120749 | 4/1999 |
| WO | WO 99/08280 | 2/1999 |
| WO | WO 99/08281 | 2/1999 |
| WO | WO 99/08282 | 2/1999 |
| WO | WO 99/34601 | 7/1999 |

* cited by examiner

*Primary Examiner*—Vincent Boccio
(74) *Attorney, Agent, or Firm*—Parkhurst & Wendel, L.L.P.

(57) ABSTRACT

The present invention provides optical disc playback apparatus (DVD-Universal players) which can play back all ATSs and VTSs. The optical disc playback apparatus according to the present invention comprises reading means for reading audio/video data, audio/video sequence information 76, object position information 75, title set position information and disc management information from an optical disc 20, to play back the data, control means for controlling the reading means, storage means 16 which, when the disc is recognized as a DVD-Audio disc, contain an AMG 60, further search a VMG 40 and when there is a VMG 40, simultaneously contain also the VMG 40, and external input receiving means for receiving instructions of users from outside, for selecting one of the AMG 60 and the VMG

5 Claims, 13 Drawing Sheets

Fig.6
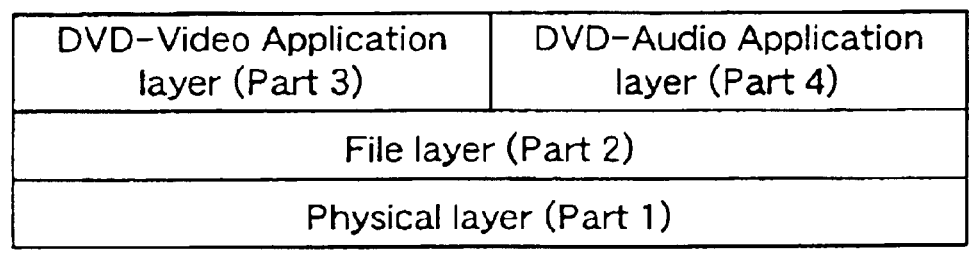
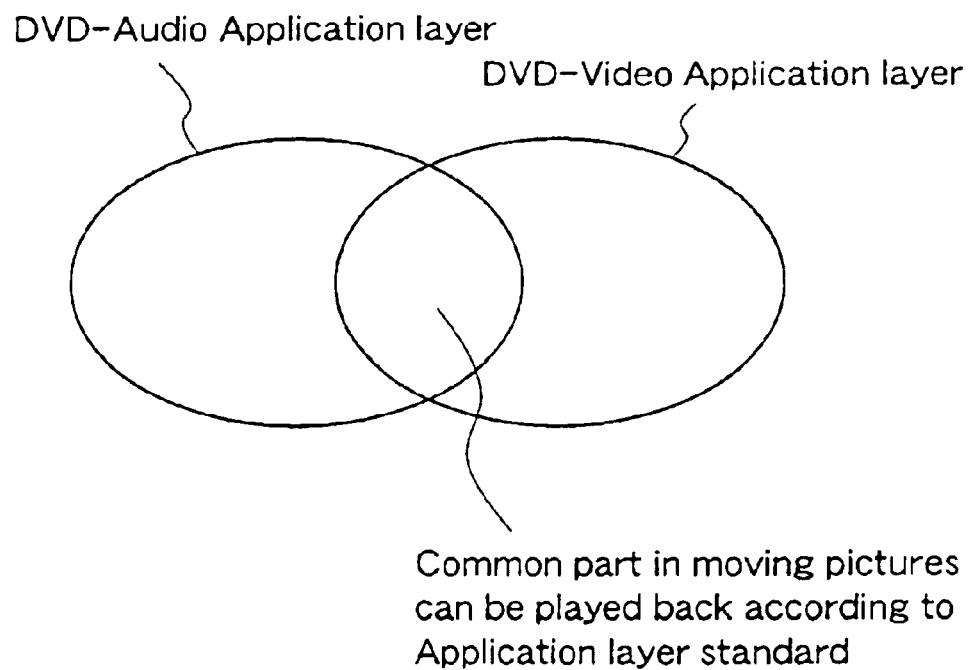

Fig.7

| Main Item | | DVD-Audio Standard | DVD-Video Standard |
|---|---|---|---|
| Video Playback Stream | | MPEG1, MPEG2 | MPEG1, MPEG2 |
| Audio Playback Stream | Stream | 1.LinearPCM(mandatory)<br>2.PackedPCM(mandatory) Lossless compression<br>3.AC-3(option) compression<br>4.DTS(option) compression | 1.AC-3(mandatory) compression<br>2.LinearPCM(mandatory)<br>3.MPEG(mandatory) compression<br>4.DTS(option) compression<br>5.SDDS(option) |
| | Number of Channel<br>Sampling Frequency<br>Quantization | Max.6(in linear) corresponding to Smart Contents<br>48KHz/44.1KHz×1, 2, 4 Max.192KHz<br>16/20/24bits | Max.6(in compression)<br>48KHz×1, 2 Max.96KHz<br>16/20/24bits |
| Still Picture Playback | | 1.Browsable<br>2.Random/shuffle<br>3.Sequential<br>4.Maximum number ASVU Unit 2Mbyte*99<br>About 1000 frames (depending on image quality) | None |
| Text | | 1.Normal TextData<br>2.RealTimeText | 1.Normal TextData |
| Others | | 1.Hidden Track Playback<br>2.Spotlight Playback<br>3.Audio Selection<br>4.No Parental Control<br>5.No Region Code Control | 1.Multi Angle<br>2.Multi Caption<br>3.Multi Voice<br>4.Parental Control<br>5.Region Code Control |
| Disc Management Information | | AMG | VMG |
| Management Target Title Set | | ATS+VTS | VTS |
| Navigation Command | | · Commands defined by AMG and ATS are different from those of Video and peculiar to Audio<br>· Commands defined by VTS are ones having restriction on Video Standard | Commands defined by VMG and VTS are peculiar to Video |

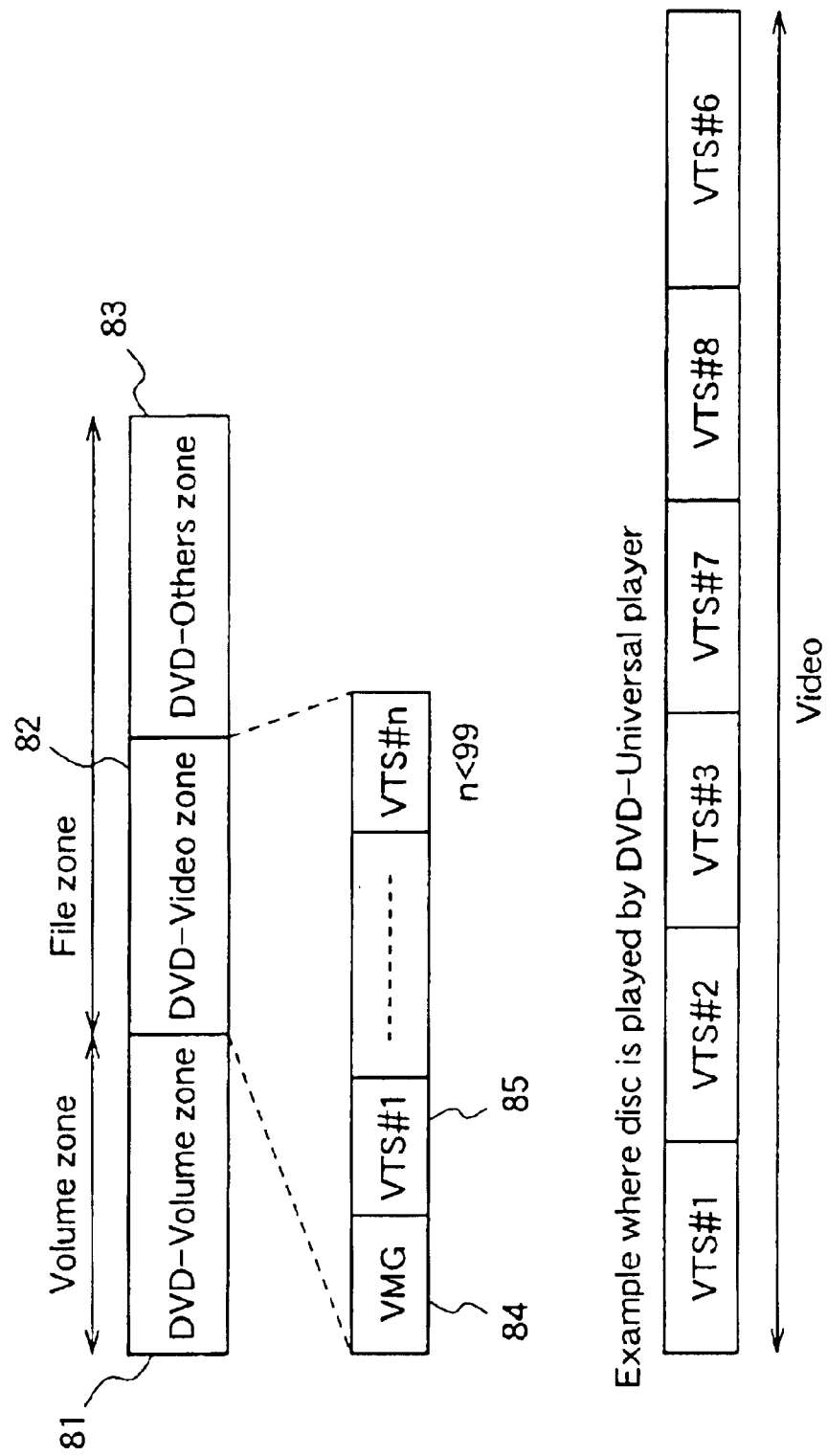

Fig.12

| DISC | Disc type | DVD-Video Disc | DVD-Audio Disc | DVD-Audio Disc (mixed) |
|---|---|---|---|---|
| | Playback object construction | VTS | ATS | ATS+VTS |
| | Disc Management Information | VMG | AMG | AMG+VMG |
| Player | DVD-Video Player | ○ | × | △ Only all VTS can be played |
| | DVD-Audio Player | × | ○ | △ Only all ATS can be played |
| | DVD-Univerasal Player | ○ | ○ | △ Part of all ATS and VTS can be played ← Problem |

OPTICAL DISC PLAYBACK APPARATUS AND OPTICAL DISC PLAYBACK METHOD

FIELD OF THE INVENTION

The present invention relates to apparatus and methods for playing back optical discs on which multimedia data including digital moving picture data and digital audio data are recorded. More particularly, the present invention relates to playback apparatus which use optical discs including plural and different kinds of disc management information, in which apparatus the plural kinds of disc ha management information can be selected by users, whereby all audio data or video data recorded on the optical discs can be played back.

BACKGROUND OF THE INVENTION

In recent years, DVD (Digital Versatile Disc)-Videos having greatly increased storage capacities are coming into wide use in place of conventional laser discs and video CDs, and many movies are put on the market. These DVD-Video standard discs are standardized attaching importance to playback of video, without attaching importance to playback of various types of audio. Therefore, DVD-Video standard cannot realize playback in conditions of linear PCM, 192-KHz sampling frequency, 24 bit/sec, 2 channels, and more than 74 minutes, or playback in conditions of linear PCM, 96-KHz sampling frequency, 24 bit/sec, 6 channels, and more than 74 minutes, for example. Accordingly, DVD-Audio standard is established as DVD standard which attaches importance to the playback of various types of audio. As shown in FIG. 6 showing the relationship on standards between DVD-Video standard and DVD-Audio standard, the physical layer structure and file layer structure of DVD-Audio standard are the same as those of DVD-Video standard, and only its application layer structure is different from that of DVD-Video standard. However, DVD-Video standard and DVD-Audio standard have a common part in the application layer structure. FIG. 7 shows the comparison of contents between DVD-Video standard and DVD-Audio standard. (Note: DVD-Video standard Ver.1.0, issued in August 1996, DVD-Audio standard Ver.1.0, issued in March 1999.)

A data structure according to DVD standard is divided broadly into a Volume zone and a File zone. Information of files in the File zone is recorded in the Volume zone. Video data files, audio data files and files of data other than audio/video data (for example, computer data) are recorded in the File zone. The video data files, the audio data files and the files of data other than audio/video data correspond to a DVD-Video zone, a DVD-Audio zone and a DVD-others zone, respectively.

FIG. 8 shows a data structure of a file in a DVD-Video standard disc. Three zones, i.e., a DVD-Volume zone 81, a DVD-Video zone 82 and a DVD-Others zone 83 are defined. Among those, the DVD-Video zone 82 comprises one piece of video disc management information (i.e., Video Manager, hereinafter referred to also as "VMG") 84 and one or more Video Title Sets (hereinafter referred to also as "VTS") 85.

On the other hand, FIG. 9 shows a data structure of a file in a DVD-Audio standard disc having both of an Audio zone and a Video zone. Four zones, i.e., a DVD-Volume zone 91, a DVD-Audio zone 92, a DVD-Video zone 93 and a DVD-Others zone 94 are defined. Among those, the DVD-Audio zone 92 comprises one piece of audio disc management information (i.e., Audio Manager, hereinafter referred to also as "AMG") 95 and one or more Audio Title Sets (hereinafter referred to also as "ATS") 96. The DVD-Video zone 93 comprises one VMG 97 and one or more VTSs 98. That is, according to DVD-Audio standard, one disc can simultaneously have the DVD-Audio zone 92 and the DVD-Video zone 93. When titles in the DVD-Audio zone 92 are to be selected, the ATS(#1–#m) 96 are selected and when titles in the DVD-Video zone 93 are to be selected, the VTS(#1–#n) 98 are selected. Although the DVD-Video zone 93 has the VMG 97, when the disc is to be managed as a DVD-Audio standard disc, the whole disc is managed using the AMG 95 instead of the VMG 97. When this disc is to be managed as a DVD-Video standard disc, the whole disc is managed using the VMG 97 instead of the AMG 95 while the Audio zone 92 cannot be played back.

FIG. 10 shows a data structure of a file in a DVD-Audio standard disc having only an Audio zone. In this case, since there is no Video zone, no VMG is included and only the AMG is included as disc management information.

FIG. 5 shows a case where the DVD-Audio standard disc including both of the ATSs and VTSs as shown in FIG. 9 is played back using the AMG, and FIG. 4 shows a case this disc is played back using the VMG. When the disc is played back using an AMG 60 as shown in FIG. 5, whether a selected title is the ATS or VTS is included in a Title Set Search Pointer 66 in the AMG 60 as Audio Title Category information 67.

As shown in FIG. 5, Title Set Management Information 68 includes Object Position Information 75 indicating the position of audio/video data on the optical disc and Sequence information 76 indicating the playback order of the audio/video data in a lower layer, as Program Chain Information (hereinafter referred to also as "PGCI"). When the playback is to be performed, a Title Set which is specified by the PGCI in the Title Set Management Information is played back. Conversely, even when there are audio/video data as Title Sets, when the playback order indicating the data is not specified by the PGCI, the data are not played back. When the disc is played back using the VMG 40 as shown in FIG. 4, Title Set Search Pointers 45 included in the VMG 40 have no information indicating the ATS but all of those indicate the VTS 41. Therefore, titles which are selected are only VTSs.

There are three kinds of DVD discs depending on the disc management information, i.e., DVD-Video standard discs having only the disc management information of VMG, DVD-Audio standard discs having only the disc management information of AMG, and DVD-Audio standard discs having both of the disc management information of VMG and AMG. In the flu DVD-Video standard discs, the playback is performed according to the disc management information of VMG. The DVD-Audio standard discs may include both of the disc management information of AMG and VMG. However, when the discs are played, the playback is performed using one of the disc management information according to types of players. At this time, when the VMG is employed, only the VTSs are managed. When the AMG is employed, the ATSs and VTSs are managed. However, since part of region code management or navigation commands which are specified by the VMG are not defined by the AMG, the whole VTSs are not always managed by the disc management information of AMG. That is, the number #n of VTSs which are managed by the AMG as shown in FIG. 5 is equal to or smaller than the number #p of VTSs which are managed by the VMG as shown in FIG. 4.

FIG. 11 shows the relationship between the discs and players in considering the playback method being combined with the players. To be specific, when a DVD-Video standard disc 112 having only VTSs is played back by a conventional DVD-Video player 111, all the VTSs are played back according to the VMG disc management information. When a DVD-Audio standard disc 114 in which ATSs and VTSs are mixed and which has both of AMG and VMG is played back by the DVD-Video player 111, the playback is performed similarly according to the VMG disc management information, whereby all the VTSs are played back, but the ATSs are not played back. On the other hand, when the DVD-Audio standard disc 114 having both of the AMG and VMG is played back by a DVD-Universal player 113, the playback is performed according to the AMG disc management information, whereby part of the ATSs and VTSs are played back. This relationship is shown in FIG. 12.

Even when the DVD-Universal player 113 which can play back all of the DVD-Video standard disc 112, a DVD-Audio standard disc 116 and the DVD-Audio standard disc 114 having the ATS and VTS mixed is designed, the player 113 is defined so as to play back titles by using the VMG for the DVD-Video standard disc 112 and the AMG for the DVD-Audio standard discs 114 and 116. Therefore, while all the VTSs in the disc 112 can be played back using the VMG and all the ATSs in the disc 116 can be played back by using the AMG, only part of the ATSs and VTSs are played back when the disc 114 is played back using the AMG, and there is a risk of not all the VTSs being played back.

That is, even in the case of the DVD-Universal player, some VTSs cannot be played back in some discs. In this universal optical disc playback apparatus, it is required to play back all the ATSs and VTSs even when the DVD-Audio standard discs including both of the VMG and AMG are played back.

SUMMARY OF THE INVENTION

It is an object of the present invention to provide optical disc playback apparatus (DVD-Universal players) which can play back all of ATSs and VTSs even when DVD-Audio standard discs including plural and different types of disc management information such as the VMG and AMG are played back.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided an apparatus for playing back an optical disc which includes at least one audio/video data storage area which contains at least one audio title set or video title set, at least one title set management information storage area which contains audio/video sequence information indicating a playback order of prescribed pieces of audio/video data constituting an audio/video sequence, and object position information indicating positions of the audio/video data on the optical disc, and at least one disc management information storage area which contains disc management information for managing the whole disc, including title set position information indicating a position of the title set on the optical disc, and the playback apparatus comprises reading means for reading the audio/video data, the audio/video sequence information, the object position information, the title set position information, and the disc management information from the optical disc, to play back the data; control means for controlling the reading means; storage means which contain the disc management information obtained from the at least one disc management information storage area; and external input receiving means for receiving an external input for disc management information selected by a user among plural kinds of the disc management information obtained from the at least one disc management information storage area, and in the playback apparatus, the control means control the reading means so as to read the audio/video sequence information, the object position information, the title set position information and the disc management information from the optical disc, to play back the audio/video data successively according to the disc management information, the title set position information, the audio/video sequence information and the object position information, and when an instruction for selecting one of the plural kinds of disc management information is given, the control means select the disc management information in accordance with the instruction, and perform control so as to play back the audio data or video data on the basis of the title set position information included in the disc management information, the sequence information, and the object position information. Therefore, even when a DVD-Audio standard disc including both of the VMG and AMG is played, users can arbitrarily switch the disc management information between the AMG and VMG, whereby the optical disc playback apparatus (DVD-Universal players) can play back all ATSs and VTSs.

According to a 2nd aspect of the present invention, there is provided an apparatus for playing back an optical disc in which at least one audio title set or video title set, audio disc management information and video disc management information for respectively managing whole titles in the audio title set or video title set, audio/video sequence information, object position information, and title set position information are stored in the medium, comprising information reading means for reading the audio title set or video title set, the audio disc management information, the video disc management information, the audio/video sequence information, the object position information and the title set position information from the optical disc, and storing the audio/video sequence information, the object position information, and the title set position information in a buffer memory; storing means which contain the read audio disc management information and video disc management information, respectively; external input receiving means for receiving an external input for disc management information which is stored in the storage means and selected by a user; and control means for controlling the information reading means so as to read required audio data or video data from the optical disc on the basis of one of the audio disc management information and video disc management information selected by the external input receiving means, to play back the data. Therefore, the optical disc playback apparatus (DVD-Universal player) can play back all of the ATSs and VTSs.

According to a 3rd aspect of the present invention, in the optical disc playback apparatus of the 2nd aspect, the control means control the reading means so as to play back audio or video data on the basis of the title set position information indicating a position of a title set included in the selected audio disc management information or video disc management information, the sequence information stored in the buffer memory which indicates a playback order of the audio or video data, and the object position information indicating positions of the audio or video data on the optical disc. Therefore, data of a selected title set can be arbitrarily played back.

According to a 4th aspect of the present invention, there is provided a method for playing back an optical disc in which at least one audio title set or video title set, audio disc management information and video disc management information for respectively managing titles in the audio title set or video title set, audio/video sequence information, object position information, and title set position information are stored in the medium, comprising steps of reading the audio title set or video title set, the audio disc management information, the video disc management information, the audio/video sequence information, the object position information and the title set position information from the optical disc; storing the read audio disc management information and video disc management information, respectively; receiving an external input for disc management information selected by a user among the stored audio disc management information and video disc management information; and reading required audio data or video data from the optical disc on the basis of the audio disc management information or video disc management information selected in accordance with a selection instruction signal which is input from outside, and playing back the data. Therefore, even when a DVD-Audio standard disc including both of the VMG and AMG is played back, the users can arbitrarily switch disc management information between the AMG and VMG, whereby the optical disc playback apparatus (DVD-Universal players) can play back all the ATSs and VTSs.

According to a 5th aspect of the present invention, there is provided an optical disc playback apparatus for playing back data which are recorded on an optical disc having a physical layer specifying a physical structure, a file layer specifying a data file structure and at least two application layers specifying application structures disposed on the common physical layer and file layer, comprising information reading means for reading respective management information in the plural application layers, and data, sequence information, object position information and title set position information included in applications; storage means which contain the plural management information read by the information reading means; selection means for selecting desired management information among the plural management information stored in the storage means, in accordance with a selection by a user; and control means for controlling the information reading means so as to read required data from the optical disc on the basis of the desired management information selected by the selection means and play back the data. Therefore, even when a DVD-Audio standard disc including both of the VMG and AMG is played back, the users can arbitrarily switch disc management information between the AMG and VMG, whereby the optical disc playback apparatus (DVD-Universal players) can play back all the ATSs and VTSs.

BRIEF DESCRIPTION OF THE DRAWINGS

FIG. 6 is a diagram showing the relationship on standards between DVD-Video standard and DVD-Audio standard.

FIG. 7 is a diagram showing the comparison of contents between DVD-Video standard and DVD-Audio standard.

FIG. 8 is a diagram illustrating a data structure of a file in a DVD-Video standard disc.

FIG. 12 is a diagram showing the relationship between DVD players and discs to be played back.

DETAILED DESCRIPTION OF THE PREFERRED EMBODIMENTS

Hereinafter, an embodiment of the present invention will be described with reference to FIGS. 1 to 5.

[Embodiment 1]

Figure 1:
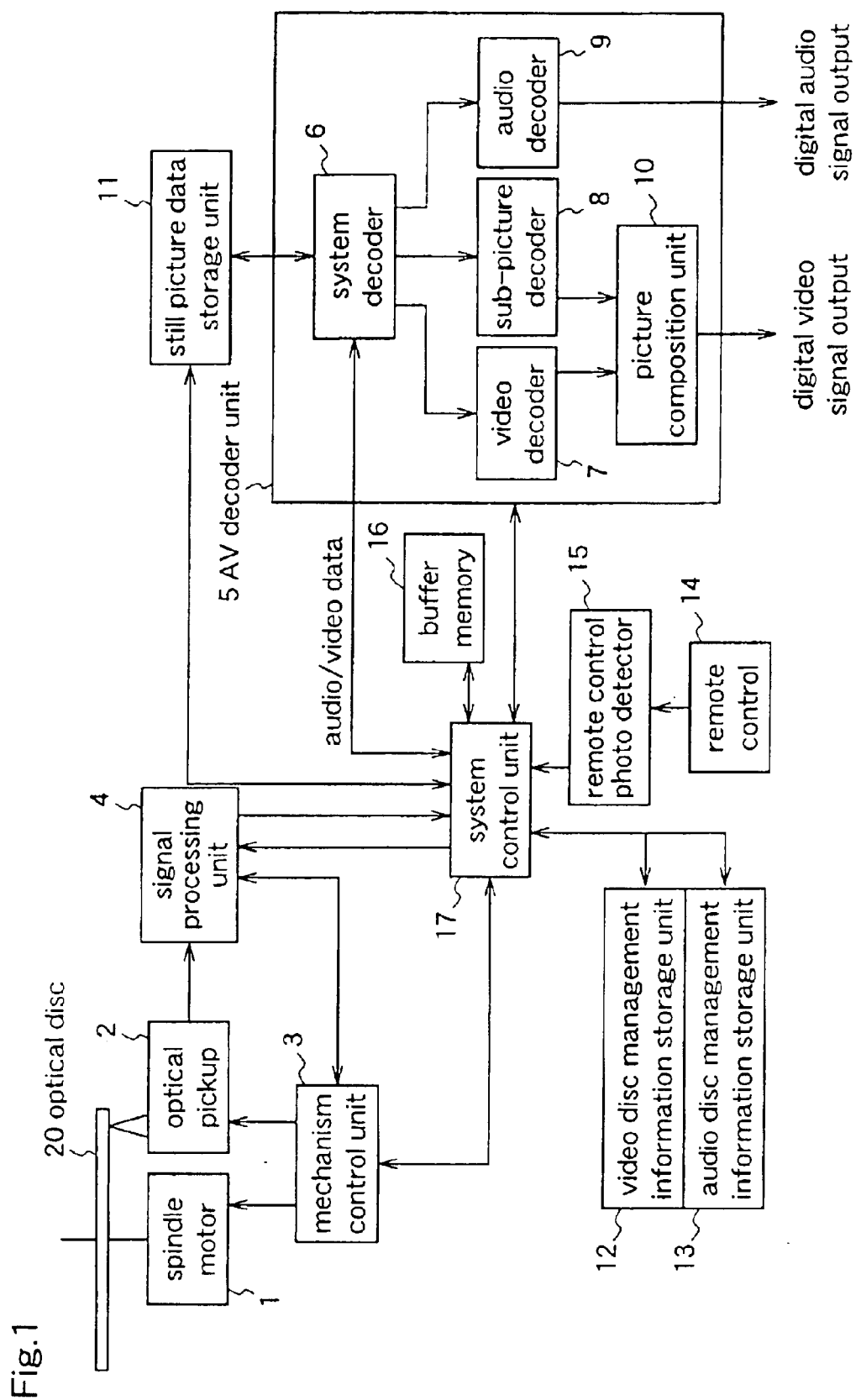
FIG. 1 is a block diagram illustrating a whole structure of an optical disc playback apparatus according to a first embodiment of the present invention.

FIG. 1 is a block diagram illustrating a whole structure of an optical disc playback apparatus according to a first embodiment of the present invention. In FIG. 1, reference numeral 1 denotes a spindle motor for rotating an optical disc 20. Numeral 2 denotes an optical pickup for reading signals recorded on the optical disc 20. Numeral 3 denotes a mechanism control unit for controlling the spindle motor 1 and the optical pickup 2. Numeral 4 denotes a signal processing unit for demodulating the signals from the optical pickup 2 into digital signals. Numeral 5 denotes an AV decoder unit for decoding video and audio data which are obtained from the signal processing unit 4 via a system control unit 17 and a buffer memory 16 (described later). The AV decoder unit 5 comprises a system decoder 6, a video decoder 7, a sub-picture decoder 8, an audio decoder 9 and a picture composition unit 10. Numeral 11 denotes a still picture data storage unit which contains still picture data recorded on DVD-Audio standard discs. Numeral 12 denotes a video disc management information storage unit which contains video disc management information. Numeral 13 denotes an audio disc management information storage unit which contains audio disc management information. Numeral 14 denotes a remote control transmitter. Numeral 15 denotes a remote control photo detector for receiving remote control signals. The buffer memory 16 temporarily retains data from the signal processing unit 4 via the system control unit 17 (described later). The system control unit 17 receives the signals of the remote control photo detector 15 and controls the mechanism control unit 3, the signal processing unit 4, the buffer memory 16, the still picture data storage unit 11, to the AV decoder 5, the video disc management information storage unit 12 and the audio disc management information storage unit 13.

The mechanism control unit 3 controls a mechanism system including the spindle motor 1 for driving the disc and the optical pickup 2 for reading the signals recorded on the disc. To be specific, the mechanism control unit 3 controls the speed of the spindle motor and simultaneously controls the actuator of the optical pickup 2 so as to move the pickup position, according to track position information indicated by the system control, unit 17. When a correct track is detected under servo control, the unit 3 subjects the optical pickup 2 to rotational delay until the pickup 2 reaches a position where a desired physical sector is recorded, and controls the pickup so as to read signals continuously from the desired position.

The signal processing unit 4 subjects the signals which are read by the optical pickup 2 to signal processing such as amplification, waveform shaping, binarization, demodulation and error correction, and processed data are stored in the buffer memory 16 in logical block units. The system control unit 17 reads the data stored in the buffer memory 16, and when the read data are the video disc management information, stores the data in the video disc management information storage unit 12. When the read data are audio disc management information, the data are stored in the audio disc management information storage unit 13. When the data read from the buffer memory 16 are still picture data, the data are stored in the still picture data storage unit 11. Similarly, when the data read from the buffer memory 16 are data in a title set management information storage area, the system control unit 17 reads audio/video sequence information and object position information, and transfers the audio/video data to the system decoder 6.

The AV decoder unit 5 decodes the audio/video data which was subjected to the signal processing, into original audio signals or video signals.

The system decoder 6 distinguishes among data on the basis of stream ID and substream ID information included in the audio/video data which are transferred from the buffer memory 16 via the system control unit 17 in packet units, and outputs video data to the video decoder 7, sub-picture data to the sub-picture decoder 8, and audio data to the audio decoder 9, respectively. In addition, when the system control unit 17 inputs the still picture data from the still picture data storage unit 11 to the system decoder 6, the system decoder 6 outputs the still picture data to the video decoder 7 as video data.

The video decoder 7 decodes and decompresses the video data which are input by the system decoder 6, and outputs digital video signals to the picture composition unit 10.

When the sub-picture data which are input by the system decoder 6 are run-length-compressed image data, the sub-picture decoder 8 decodes and decompresses the data, and outputs the decoded and decompressed data to the picture composition unit 10 in the same format as that of the video signal.

The audio decoder 9 decodes and decompresses the audio data which are input by the system decoder 6, and outputs digital audio signals. The digital audio signals are converted into analog audio signals by a circuit (not shown), and thereafter input to an audio input of a display apparatus or an audio amplifier.

The picture composition unit 10 outputs digital video signals which are obtained by combining the output of the video decoder 7 and the output of the sub-picture decoder 8 at a ratio indicated by the system control unit 17. These video signals are converted into analog video signals by a circuit (not shown), and thereafter input to a video input of the display apparatus.

Figure 2:
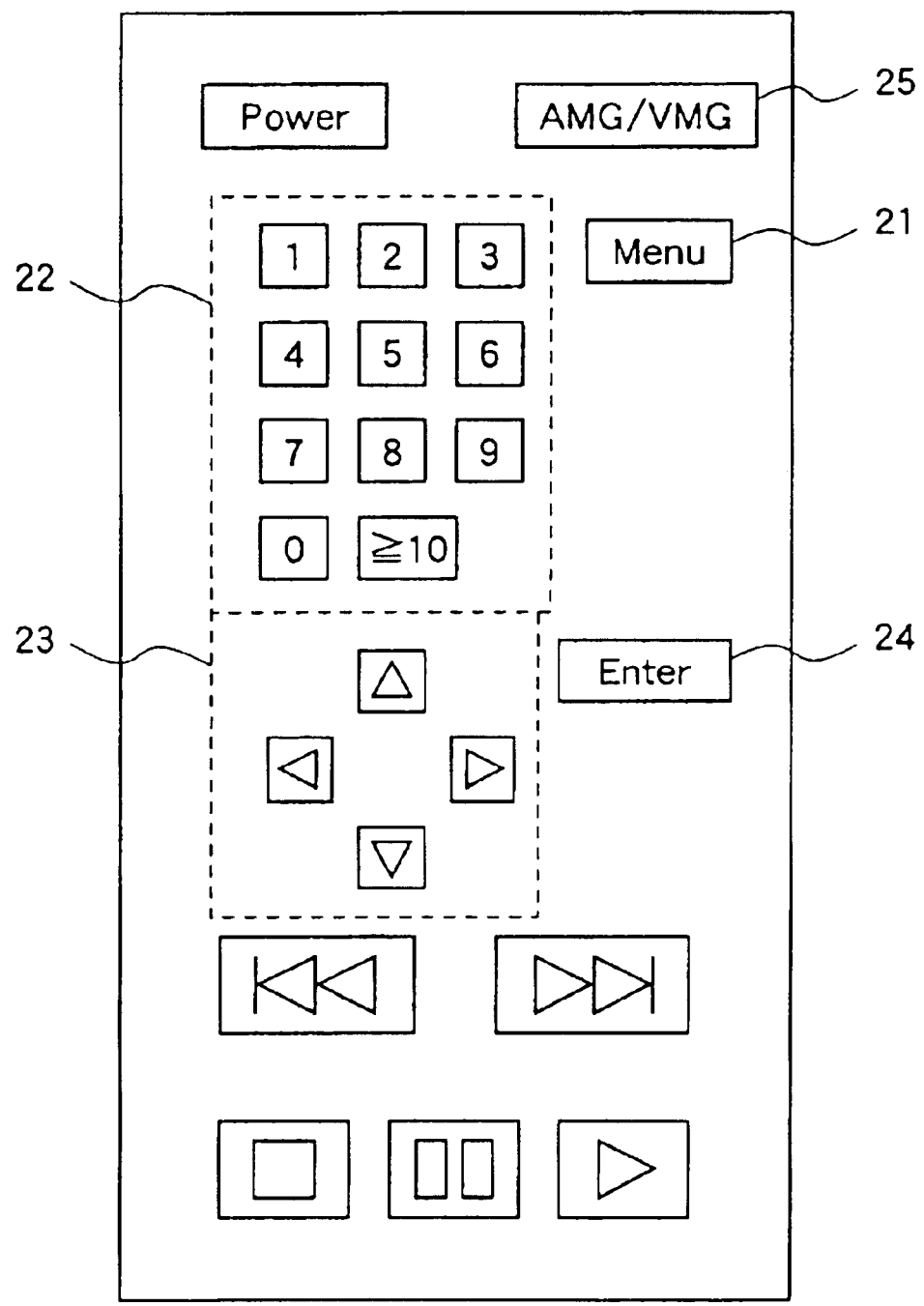
FIG. 2 is an external view illustrating an operational part of a remote control transmitter of the optical disc playback apparatus of the first embodiment.

The remote control 14 receives playback control instructions by the operation of users. FIG. 2 shows an example of key arrangement of the remote control 14. A "Menu" key 21 is one for calling a whole menu showing plural menu items (titles) at a glance, which is displayed during playback of discs. "Ten" keys 22 and "direction" keys 23 are keys for selecting one of the displayed menu items. A "Enter" key 24 is one for determining the selected item. An "AMG/VMG" key 25 is one for switching disc management information. The user selects a desired title from the displayed whole menu using the "ten" keys 22 and "direction" keys 23.

The remote control photo detector 15 receives infrared key signals which are transmitted by pressing the keys of the remote control 14, and transmits key data to the system control unit 17.

The buffer memory 16 temporarily retains the data which are input from the signal processing unit 4 via the system control unit 17.

Though not shown but the system control unit 17 comprises a program memory which contains a program for realizing the function as the system control unit, a processor which implements the program, a general register and a timer, and controls the whole optical disc playback apparatus. To be specific, the unit 17 stores the data transferred from the signal processing unit 4 in the buffer memory 16, reads the data from the buffer memory 16, and performs the control according to types of the read data. That is, when the read data are disc management information, the system control unit 17 stores the data in the video disc management information storage unit 12 or the audio disc management information storage unit 13, and performs the control on the basis of contents of these data. When the read data are title set management information such as the audio/video sequence information and object position information, the unit 17 performs the control on the basis of contents of these data. When the read data are audio/video data, the unit 17 transfers the audio/video data from the buffer memory 16 to the AV decoder unit 5. When the data are still picture data of DVD-Audio standard discs, the data are stored in the still picture data storage unit 11. In addition, the system control unit 17 calculates a track on the disc corresponding to a logical block which is to be read next, indicates the position of the track, and instructs the mechanism control unit 3 to perform block reading control. Further, the unit 17 receives the signals from the remote control photo detector 15, converts the signals into data codes corresponding to pressed keys, and performs the playback control according to the keys.

Hereinafter, the operation of the optical disc playback apparatus having the above-described structure will be described.

Figure 3:
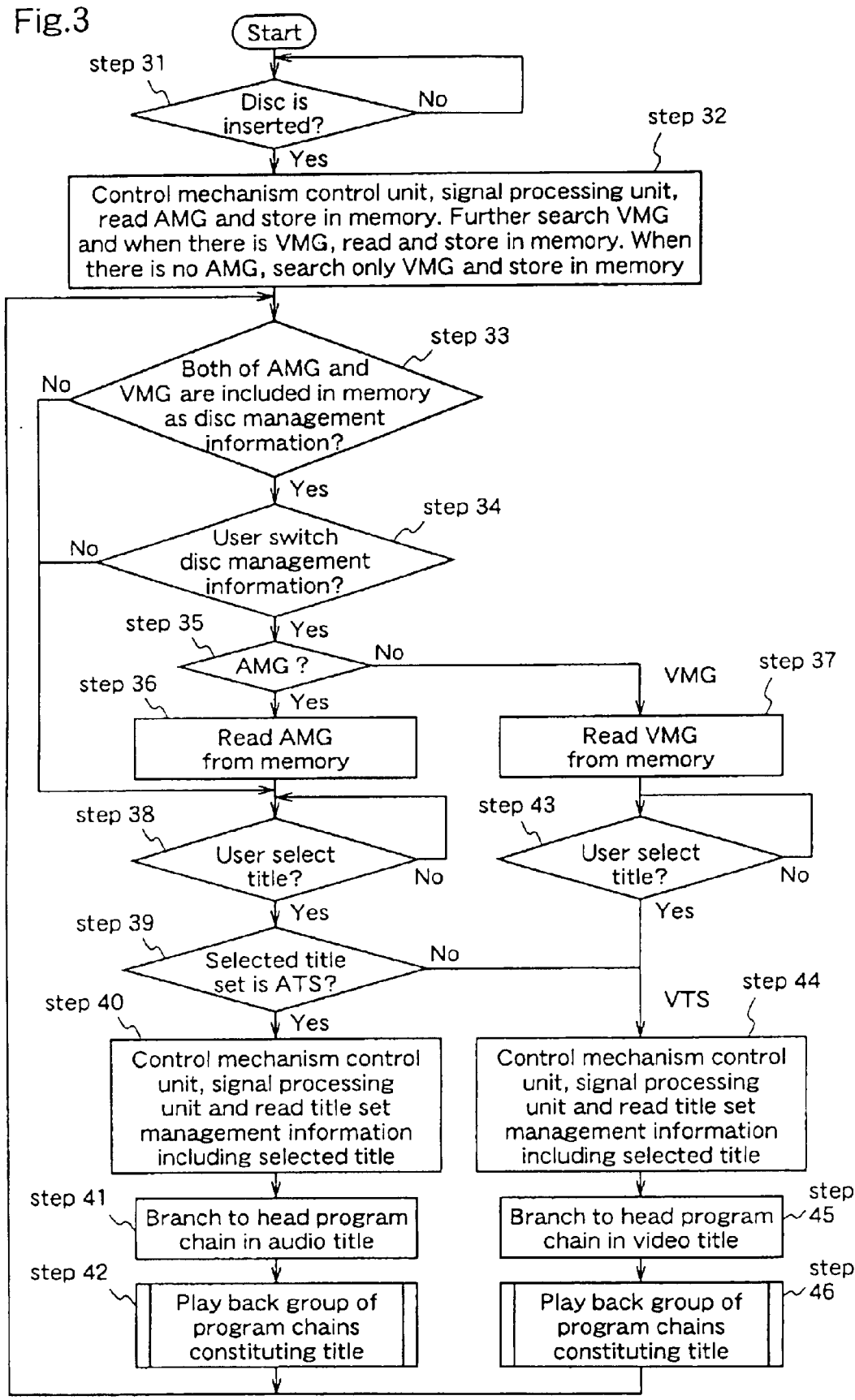
FIG. 3 is a flowchart showing contents of processing by a system control unit of the optical disc playback apparatus.

FIG. 3 is a flowchart showing contents of the processing by the system control unit 17.

Initially, when the system control unit 17 detects that a disc is mounted on the playback apparatus (step S31), it controls the mechanism control unit 3 and the signal processing unit 4, thereby controlling the rotation of the disc so as to realize stable reading of data. When the stable reading of data is realized, the unit 17 moves the optical pickup in a Volume zone, and controls the optical pickup so as to read information of a file in a File zone, which is recorded in the Volume zone. Then, the unit 17 reads disc management information on the basis of the read file information. When the read information is video disc management information, the unit 17 stores the data in the video disc management information storage unit 12 and terminates the processing. When the read information is audio disc management information, the unit 17 initially stores the data in the audio disc management information storage unit 13, and then further searches video disc management information. When there is video disc management information, the unit 17 reads the information and stores the data in the video disc management information storage unit 12 (step S32). Then, it is judged whether the VMG and AMG are stored in the disc management information storage units 12 and 13. When both of the disc management information, i.e., VMG and AMG are stored, it is checked whether the user switched the disc management information (steps S33 and S34). When the AMG is selected as the disc management information, the AMG is read from the audio disc management information storage unit 13 (steps S35 and S36). On the other hand, when the VMG is selected as the disc management information, the VMG is read from the video disc management information storage unit 12 (step S37).

In the case where the AMG is selected as the disc management information, when the user selects a desired title (step S38), the system control unit 17 judges whether the title which is selected in accordance with Title Set Search Pointer information in the disc management information is the ATS or VTS (step S39). When the selected title is the ATS, the system control unit 17 reads audio title set management information in the ATS including the selected title and its attribute tables (audio title set management table and program chain information table), retains the audio title set management information and the attribute tables (step S40), and branches to a first program chain of the audio title (step S41). Then, this program chain group is played (step S42). When the playback is finished, it returns to step S33. On the other hand, when the selected title is the VTS, the system control unit 17 reads video title set management information in the VTS including the selected title and its attribute tables, retains the video title set management information and attribute tables (step S44), and branches to a first program chain of the video title (step S45). Then, this program chain group is played (step S46). When the playback is finished, it returns to step S33.

In the case where the VMG is selected as the disc management information, when the user selects a desired title (step S43), the subsequent processes are the same as those in the above-described case where the VTS is played back using the AMG.

A file structure of a DVD-Audio standard disc having ATSs and VTSs mixed, managed by using the VMG and AMG, respectively, will be described with reference to FIGS. 4 and 5.

Figure 4:
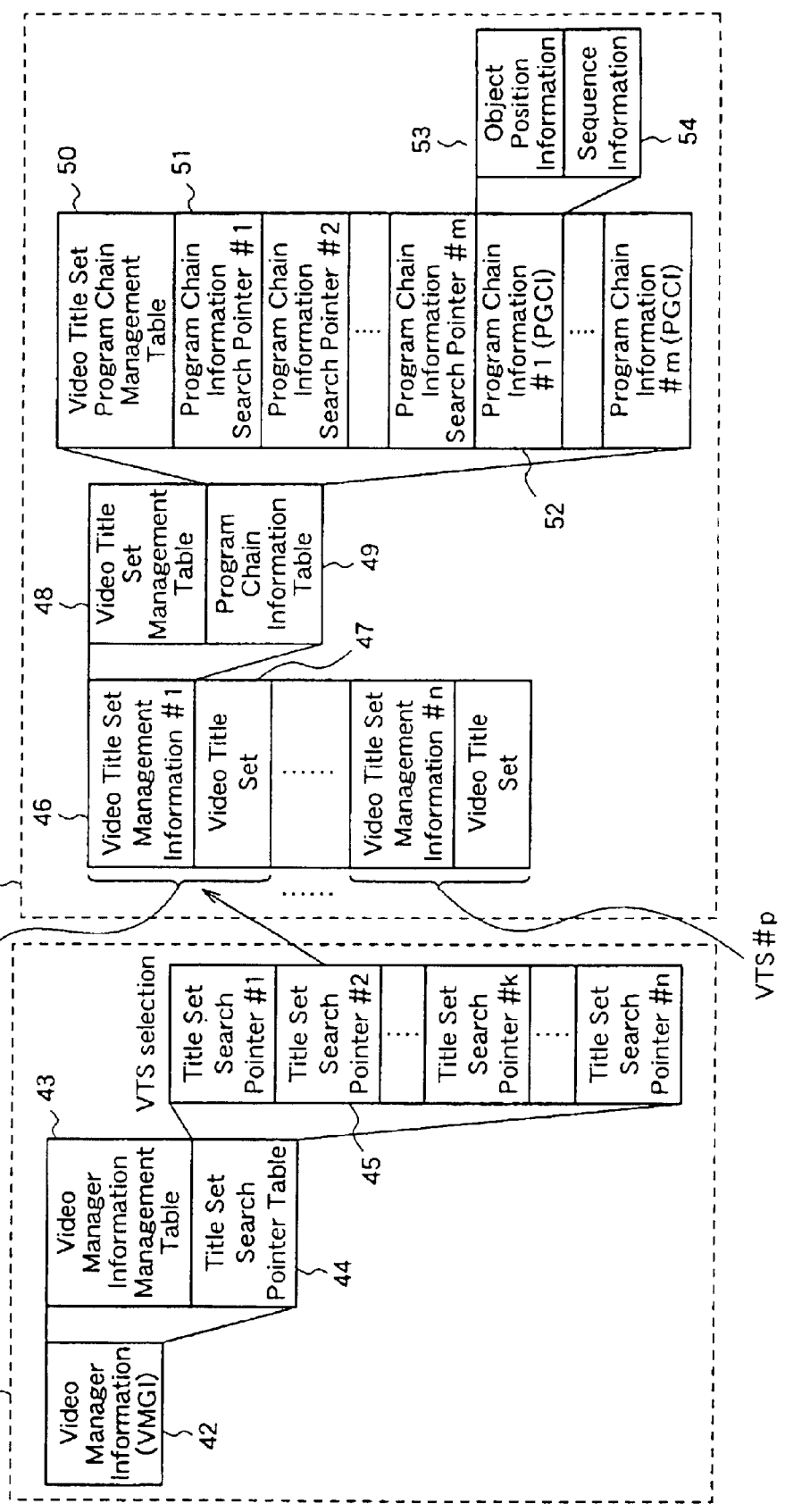
FIG. 4 is a diagram illustrating a structure of a file in a DVD-Video zone according to DVD-Video standard.

FIG. 4 shows a structure of a file in a DVD-Video zone according to DVD-Audio standard. This file comprises one VMG and one or more VTSs. Numeral 40 denotes a VMG including management information for whole video titles. Numeral 41 denotes a VTS group as a group of one or more VTSs. In the VMG 40, numeral 42 denotes a Video Manager Information (VMGI) including a Video Manager Information Management Table 43 and a Title Set Search Pointer Table 44. The Video Manager Information Management Table 43 includes the head address of each Title Set Search Pointer 45. The Title Set Search Pointer Table 44 includes data of Title Set Search Pointers 45 of respective titles. The Title Set Search Pointers 45 each indicates the management address of a VTS in the VTS group, as title set position information. Numeral 46 denotes Video Title Set Management Information each including a Video Title Set Management Table 48 and a Program Chain Information Table 49 of one VTS. Numeral 47 denotes Video Title Sets as entities of video titles. The Video Title Set Management Table 48 includes the head address of each Program Chain Information 52. The Program Chain Information Table 49 includes a Video Title Set Program Chain Management Table 50, Program Chain Information Search Pointers 51 and Program Chain Information 52. The Video Title Set Program Chain Management Table 50 includes the head address of each Program Chain Information Search Pointer 51. The Program Chain Information Search Pointer 51 indicates the management address of each Program Chain Information 52. The Program Chain Information 52 includes Object Position Information 53 indicating the position of a title on the disc and Sequence Information 54 indicating the playback order of the title.

When the user selects a title, the Title Set Search Pointer 45 in the VMG 40 is selected. The system control unit 17 reads the address of corresponding Video Title Set Management Information 46 from the selected Title Set Search Pointer 45. Then, the unit 17 retrieves the Program Chain Information 52 from the Program Chain Information Table 49, contains the playback order as the Sequence Information 54, and obtains the Object Position Information 53 on the disc, to control the mechanism control unit 3 and the signal processing unit 4. Thereby, the unit 17 moves the optical pickup 2 to a target object position and performs playback of the target VTS. Basically, all of the VTS#1–VTS#p can be designated by the VMG.

Figure 5:
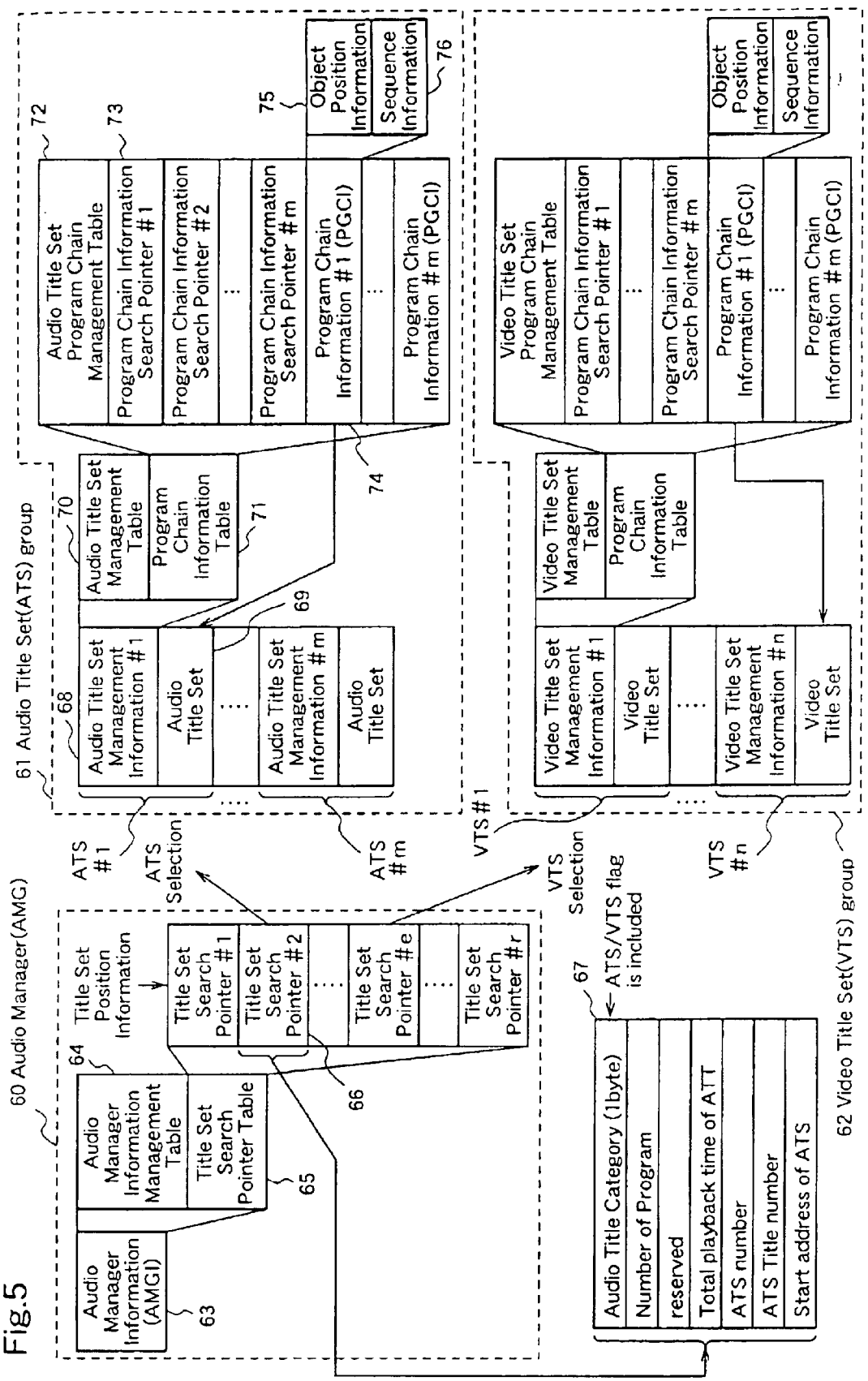
FIG. 5 is a diagram illustrating a structure of a file managed using an AMG in a case where a disc has a DVD-Audio zone and a DVD-Video zone according to DVD-Audio standard.
Figure 9:
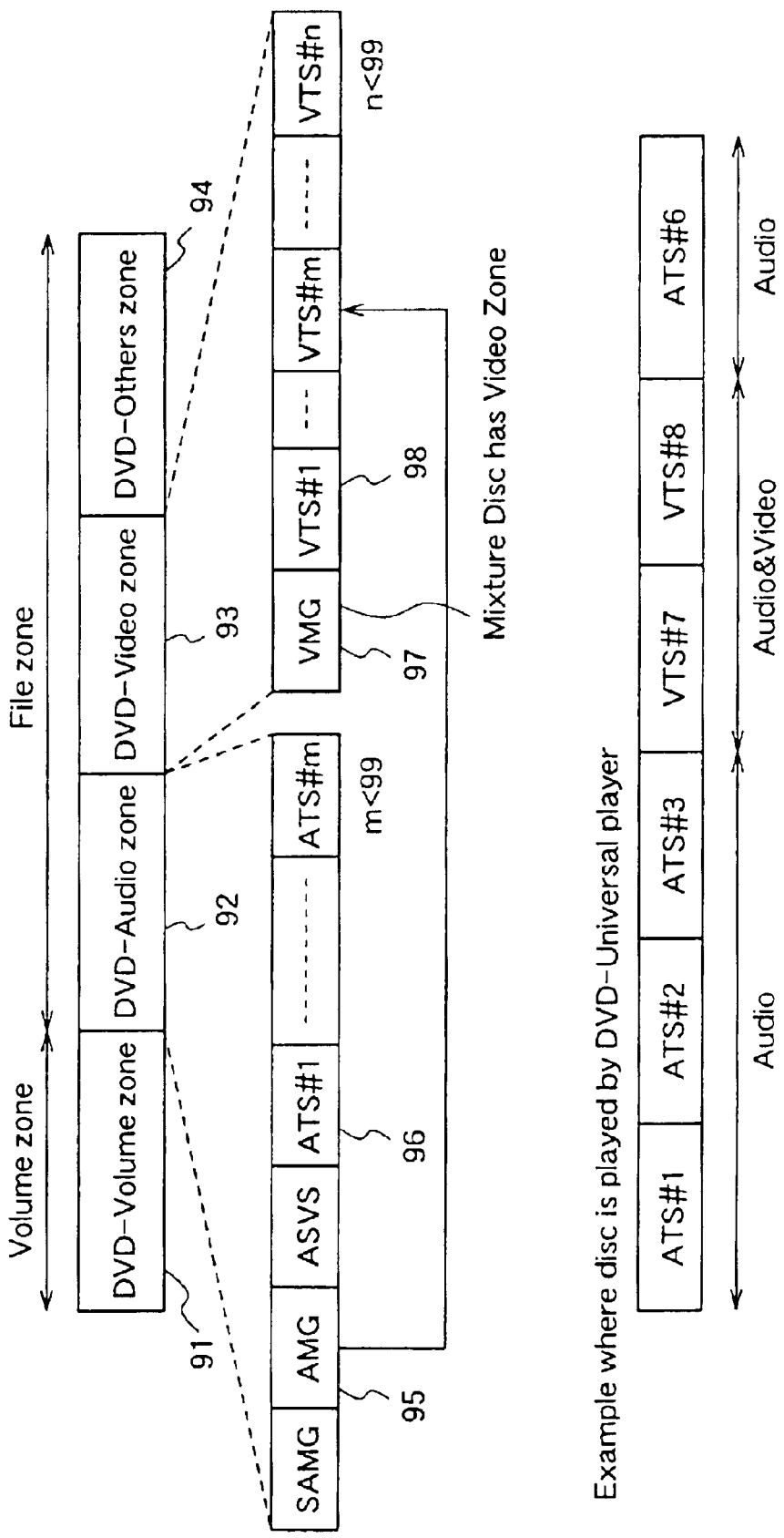
FIG. 9 is a diagram illustrating a data structure of a file in a DVD-Audio standard disc having both of an Audio zone and a Video zone.
Figure 10:
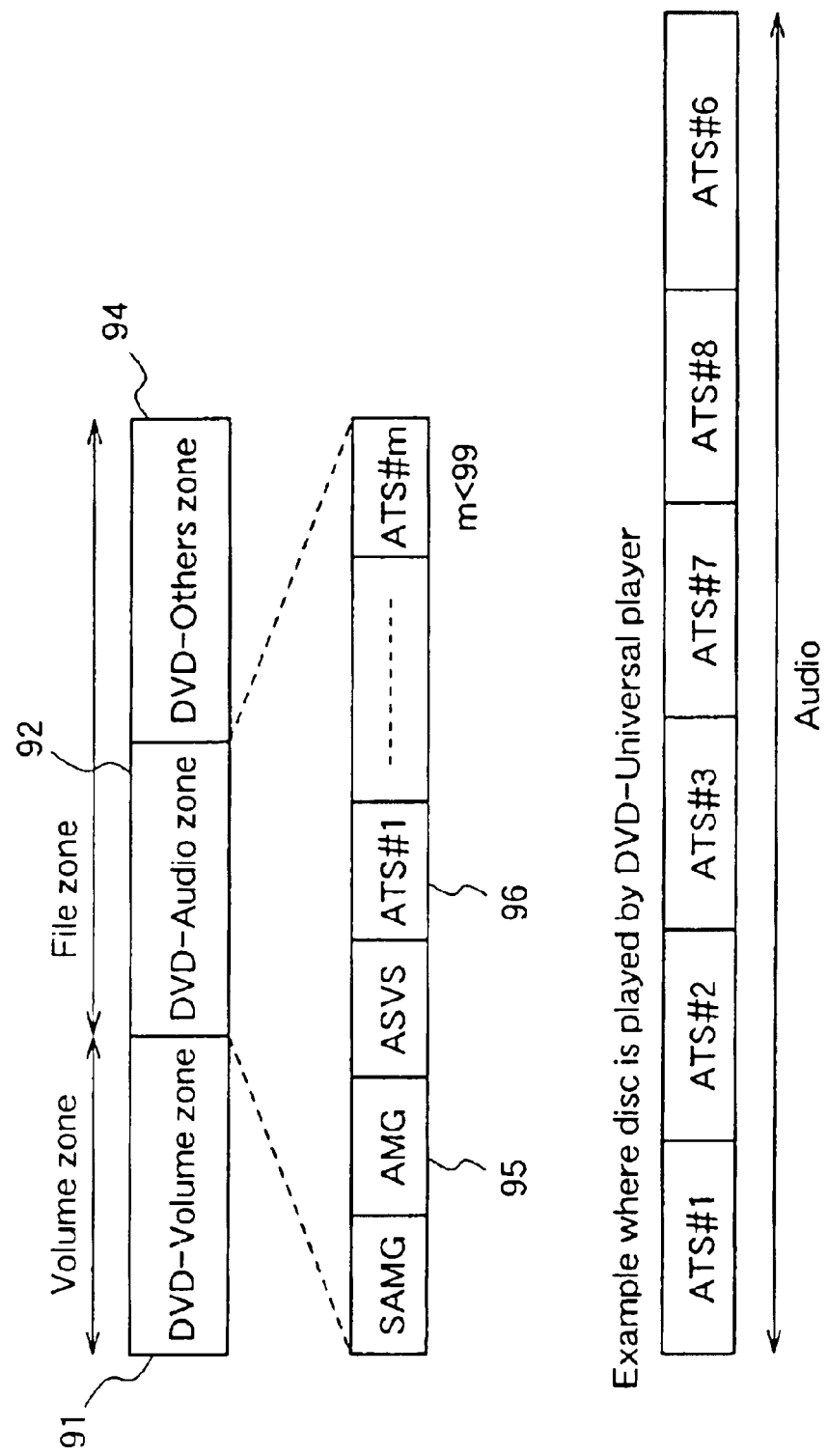
FIG. 10 is a diagram illustrating a data structure of a file in a DVD-Audio standard disc having only the Audio zone.
Figure 11:
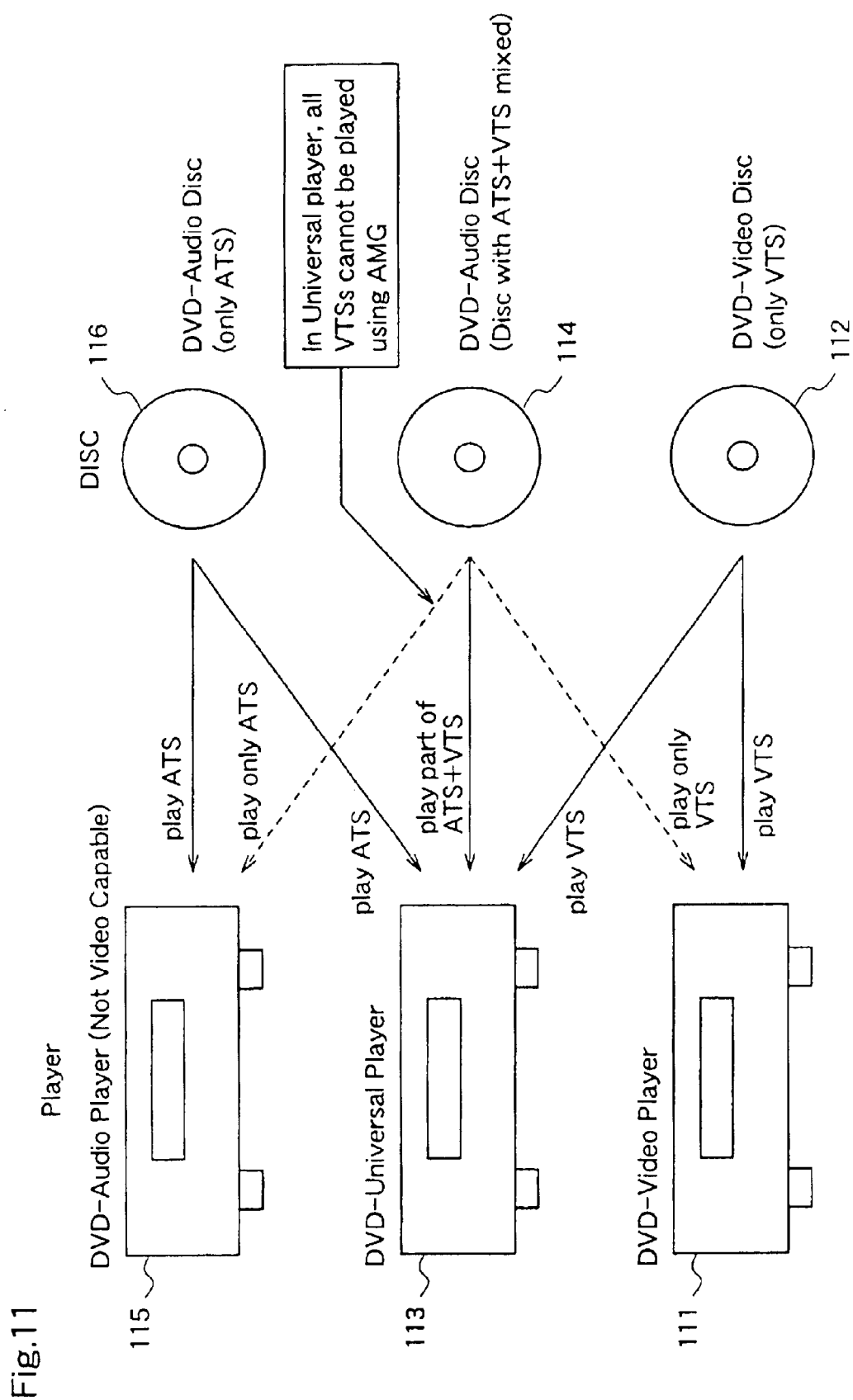
FIG. 11 is a diagram showing the relationship between DVD players and discs to be played back.

FIG. 5 shows a structure of a file having a DVD-Audio zone and a DVD-Video zone according to DVD-Audio standard, managed using the AMG. In this case, the file comprises one AMG, one or more ATSs and one or more VTSs. Although the VMG is included in the DVD-Video zone, when the disc is managed using the AMG, the VMG is not utilized. Therefore, the VMG is not described herein. Numeral 60 denotes an AMG including management information for whole titles. Numeral 61 denotes an ATS group as a group of plural ATSs. Numeral 62 denotes a VTS group as a group of plural VTSs. Numeral 63 denotes an Audio Manager Information (AMGI) including an Audio Manager Information Management Table 64 and a Title Set Search Pointer Table 65. The Audio Manager Information Management Table 64 includes the head address of each Title Set Search Pointer 66. The Title Set Search Pointer Table 65 includes data of Title Set Search Pointers 66 of respective titles. The Title Set Search Pointers 66 each indicates the management address of each title set in the ATS group and the VTS group, as title set position information. Numeral 67 denotes an Audio Title Category which is included in the Title Set Search Pointer 66 and indicates whether the title is an ATS or VTS. Numeral 68 denotes Audio Title Set Management Information each including an Audio Title Set Management Table 70 and a Program Chain Information Table 71 of one ATS. Numeral 69 denotes Audio Title Sets as entities of audio titles. The Audio Title Set Management Table 70 includes the head address of each Program Chain Information 74. The Program Chain Information Table 71 includes an Audio Title Set Program Chain Management Table 72, Program Chain Information Search Pointers 73 and Program Chain Information 74. The Audio Title Set Program Chain Management Table 72 includes the head address of each Program Chain Information Search Pointer 73. The Program Chain Information Search Pointer 73 indicates the management address of each Program Chain Information 74. The Program Chain Information 74 includes Object Position Information 75 indicating the position of a title on a disc and Sequence Information 76 indicating the playback order of the title. Since the VTS is the same as that shown in FIG. 4, it is not described here.

When the user selects a title, the Title Set Search Pointer 66 in the AMG 60 is selected. The system control unit 17 reads the ATS/VTS selection information 67 included in the selected Title Set Search Pointer 66, and selects the ATS group or the VTS group. Then, the unit 17 reads the address of corresponding Audio or Video Title Set Management Information from the selected Title Set Search Pointer 66. Then, the unit 17 retrieves the Program Chain Information 74 from the Program Chain Information Table 71, contains the playback order as the Sequence Information 76, and obtains the Object Position Information 75 on the disc, to control the mechanism control unit 3 and the signal processing unit 4. Thereby, the unit 17 moves the optical pickup 2 to a target object position and performs playback of the target ATS or VTS. At this time, there is a risk of not all the VTSs being played back using the AMG 60. To be specific, part of the region code management or navigation command specified by the VMG is not defined in the AMG 60. Accordingly, the whole VTSs are not always managed by the AMG disc management information 60. Therefore, while the same disc is played back in FIGS. 4 and 5, the number of VTSs which can be managed by the AMG is equal to or smaller than the number of VTSs which can be managed by the VMG.

When the disc according to DVD-Audio standard has only the DVD-Audio zone, only ATSs are managed by the AMG.

As described above, the optical disc playback apparatus according to the first embodiment comprises storage means which contain the AMG and VMG, respectively, and selection means for selecting one of the contained AMG and VMG in accordance with external inputs. Therefore, even when a DVD-Audio standard disc having both of the AMG and VMG is played back, this optical disc playback apparatus (DVD-Universal player) can play back all ATSs and VTSs.

Figure 13:
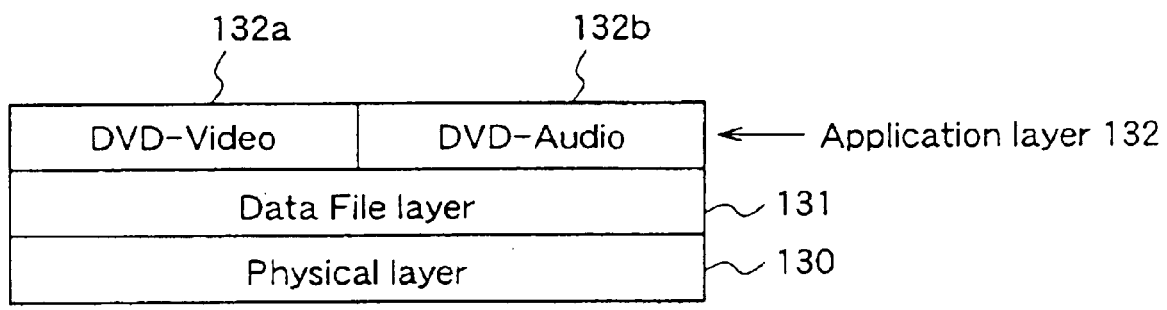
FIG. 13 is a diagram showing the concept of a disc having the same physical layer structure and file layer structure and different application layer structures.

In this first embodiment, the description is given of only the case where DVD optical discs are played back. However, when an optical disc other than DVD optical discs has a physical layer specifying the physical structure, a file layer specifying the data file structure, and at least two application layers specifying the application structure on the common physical layer and file layer as shown in FIG. 13, the present invention can be applied to the disc. In this case, when storage means contain respective management information of the applications and selection means select one of the respective management information in accordance with an external input, the optical disc having the at least two application layers can be also played according to the user's selection.

What is claimed is:

1. An apparatus for playing back an optical disc which includes at least one audio/video data storage area which contains at least one audio title set or video title set, at least one title set management information storage area which contains audio/video sequence information indicating a playback order of prescribed pieces of audio/video data constituting an audio/video sequence, and object position information indicating positions of the audio/video data on the optical disc, and at least one disc management information storage area which contains disc management information for managing the whole disc, including title set position information indicating a position of the title set on the optical disc, said playback apparatus comprising:

reading means for reading audio/video data, the audio/video sequence information, object position information, the title set position information, and disc management information from an optical disc, to play back the read data;

control means for controlling the reading means;

storage means for storing disc management information read from the at least one disc management information storage area;

external input receiving means for receiving an external input for disc management information selected by a user among plural kinds of disc management information obtained from the at least one disc management information storage area;

first judging means for determining whether or not plural kinds of disc management information are contained in the storage means; and second judging means for determining whether or not one of plural kinds of disc management information has been selected by the external input receiving means when the first judging means determines that plural kinds of disc management information are stored in the storage means, wherein the control means is for controlling the reading means to read audio/video sequence information, object position information, title set position information and disc management information from an optical disc, to play back audio/video data successively in accordance with disc management information, title set position information, audio/video sequence information and object position information, and means for receiving an instruction for selecting one of the plural kinds of disc management information the control means is for selecting disc management information in accordance with said instruction, and for performing control to play back audio data or video data on the basis of the title set position information included in the selected disc management information, sequence information, and the object position information, when the first judging means determines that plural kinds of disc management information are contained in the storage means and an instruction for selecting one of plural kinds of disc management information has been received.

2. An apparatus for playing back an optical disc in which at least one audio title set or video title set, audio disc management information and video disc management information for respectively managing whole titles in the audio title set or video title set, audio/video sequence information, object position information, and title set position information are stored, the apparatus comprising:

a buffer memory;

information reading means for reading audio title set or video title set, audio disc management information, video disc management information, audio/video sequence information, object position information and title set position information from an optical disc, and storing audio/video sequence information, object position information, and title set position information in the buffer memory;

storage means for storing read audio disc management information and video disc management information;

external input receiving means for receiving an external input comprising disc management information and means for storing said disc management information in the storage means, wherein said stored disc management information is selectable by a user; and first judging means for determining whether or not disc management information has been switched to either audio disc management information or video disc management information by the external input receiving means when the first judging means determines that audio disc management information and video disc management information are stored in the storage means; and control means for controlling the information reading means for reading required audio data or video data from an optical disc on the basis of one of audio disc management information and video disc management information selected by the external input receiving means, to play back the read data when the second judging means determines that disc management information has been switched to either audio disc management information or video disc management information by the external input receiving means.

3. The optical disc playback apparatus of claim 2 wherein said control means is for controlling the reading means to play back audio or video data on the basis of title set position information indicating a position of a title set included in selected audio disc management information or video disc management information, sequence information stored in the buffer memory which indicates a playback order of audio or video data, and object position information indicating positions of audio or video data on an optical disc.

4. A method for playing back an optical disc in which at least one audio title set or video title set, audio disc management information and video disc management information for respectively managing titles in the audio title set or video title set, audio/video sequence information, object position information, and title set position information are stored in the medium, comprising: reading an audio title set or a video title set, audio disc management information, video disc management information, audio/video sequence information, object position information and title set position information from an optical disc;

storing the read audio disc management information and video disc management information;

judging whether or not both audio disc management information and video disc management information have been stored by the storing step;

receiving external input comprising disc management information selected by a user among stored audio disc management information and video disc management information;

judging whether or not disc management information has been switched to either audio disc management information or video disc management information by receiving external input when said judging determines that both audio disc management information and video disc management information are stored; and reading required audio data or video data from an optical disc on the basis of audio disc management information or video disc management information selected in accordance with a selection instruction signal which is input from outside, and playing back read data, when said receiving external input determines that disc management information has been switched to either audio disc management information or video disc management information.

5. An optical disc playback apparatus for playing back data recorded on an optical disc having a physical layer specifying a physical structure, a file layer specifying a data file structure and at least two application layers specifying application structures located on a common physical layer and file layer, the apparatus comprising:

information reading means for reading management information in at least two application layers, and data, sequence information, object position information and title set position information included in applications;

storage means for storing plural management information read by the information reading means;

first judging means for determining whether or not plural management information are stored in the storage means;

selection means for selecting desired management information among plural management information stored in the storage means, in accordance with a selection by a user;

second judging means for determining whether or not one of plural management information has been selected by the selection means when the first judging means determines that plural management information are stored in the storage means; and control means for controlling the information reading means to read data from an optical disc on the basis of the desired management information selected by the selection means and for playing back the read data when the second judging means determines that one of the plural management information has been selected.

* * * * *